Inventor:
EDWIN T. LORIG,
by: Donald G. Dalton
his Attorney.

United States Patent Office 2,751,066
Patented June 19, 1956

2,751,066

CONVEYING AND GUIDING BELT COMPOSED OF FLATTENED METAL HELIX

Edwin T. Lorig, Ross Township, Allegheny County, Pa., assignor to United States Steel Corporation, a corporation of New Jersey Application November 15, 1950, Serial No. 195,762

3 Claims. (Cl. 198—193)

This invention relates to a metal conveying and guiding belt adapted to be driven at high speed, e. g., 4,000 or 5,000 F. P. M.

It has been proposed to hot-roll steel strip to gauges as low as .025" or even .018". This necessitates a very high speed of delivery from the last stand of a continuous mill if the speed of the strip in the earlier stands is to be maintained at the values now customary. Such delivery speeds introduce serious complications into the problem of coiling the finished strip. Ordinary coilers are not suitable for such speeds, particularly when light gauges are to be handled. It appears likely that it will be necessary to guide the leading and trailing ends of the lengths of strip onto the coiler by confinement in a chute composed of spaced conveying belts traveling at substantially the same speed as the strip, and using a belt wrapper for starting the leading end on the coiler mandrel. The object of my invention is to provide a belt suitable for such use.

The aforementioned application obviously involves severe service conditions and rough usage. In the first place, the speeds necessary require repeated flexing of the belt at high frequency if the size of the drums on pulleys over which it travels is to be kept within reasonable limits. The belt must also be capable of withstanding the temperature at which the hot-rolled strip is finished. The belt must also be little affected either physically or metallurgically by repeated heating and cooling such as results from contact with each length of hot strip followed by an idle period. In addition, the belt is subjected to heavy shock loads particularly when struck by the leading or trailing end of the strip length and to considerable centrifugal force in passing around the pulleys, thereby increasing the tension in the belt.

I have invented a belt particularly adapted for conveying and guiding hot-rolled strip traveling at high speed but useful also in other applications. In a preferred embodiment, elongated metal stock, e. g., steel strip, is wound into a helix, the ends thereof are welded together to form an endless loop and the helix is flattened to form a belt having a width several times its thickness. The inner and outer surfaces of the belt may be ground down to a thickness substantially less than the original thickness of the strip. The belt is preferably shaped longitudinally to a curvature of the same order as that of the pulleys on which it is to be used.

A complete understanding of the invention may be obtained from the following detailed description and explanation which refer to the accompanying drawings illustrating the present preferred embodiment. In the drawings, Figure 1 is a partial plan view of one face of the belt of my invention;

Figure 4:
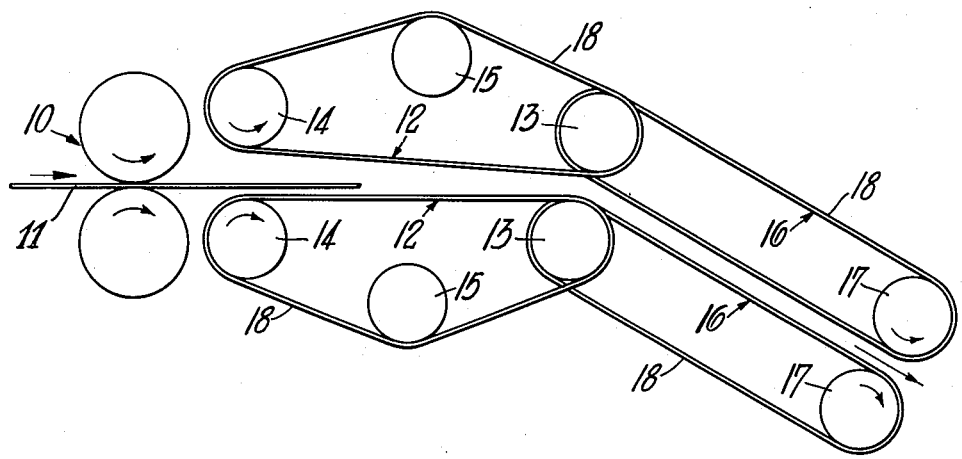
Figure 4 is a diagrammatic view illustrating conveying belts forming a chute to guide the end of a length of strip onto a coiler.

Referring now in detail to the drawings, and for the present to Figure 4, the last stand of a continuous hot-rolling mill is indicated at 10. A strip 11 issuing from the mill is delivered into a chute composed of a pair of spaced converging endless belts 12. The belts are trained over driven drums or pulleys 13, idler pulleys 14 and tightener pulleys 15. The belts 12, of course, guide and convey the strip 11 along a path therebetween. A pair of similar guiding belts 16 are trained around pulleys 13 or other pulleys coaxial therewith and idler pulleys 17. The belts 16 constitute a continuance of the guide chute for the strip 11 and deliver the leading end thereof to a coiler of any suitable design and construction (not shown). The coiler may include a belt wrapper similar in character and construction to the belts 12 and 16. This belt construction will now be described in detail.

Figure 1:
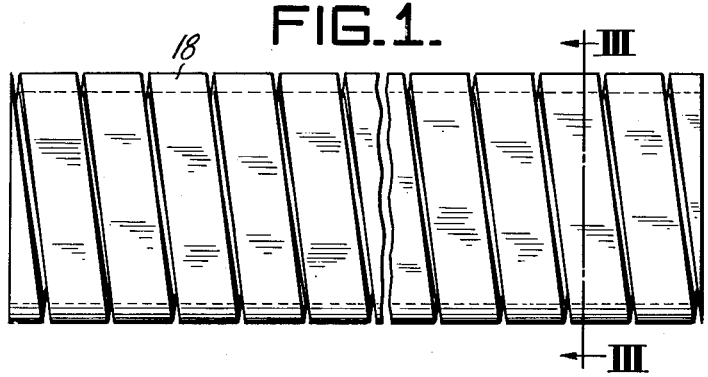
Figure 3:
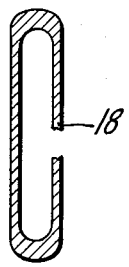
Figure 3 is a transverse section therethrough.
Figure 2:
Figure 2 is an edge view thereof.

Each of the belts 12 and 16 is composed of an endless metal band 18 of the character shown in Figures 1 through 3. This band has the form of a flattened, close-wound helix. The helix is wound from flat metal bar or strip of suitable gauge and composition, preferably stainless steel or spring steel, heated to a temperature sufficient to facilitate bending. The ends of the helix are united as by welding to form an endless loop and the helix is flattened throughout its length to give it a width several times its thickness. As a specific example, the helix may be wound from strip ½" wide and 5/32" thick and, after being welded end to end, is flattened so that it has a width of 1½" and a thickness of 9/16". While the belt is still hot, it is shaped longitudinally to a curvature approximating that of the pulleys on which it is to be used, as indicated in Figure 2. When the belt has been completely fabricated and cooled, I reduce the thickness of the inner and outer faces thereof as by grinding, to about .06". The belt in its final form thus comprises a continuous series of convolutions each of which has two spaced parallel opposite sides of substantially the same length connected by arcuate portions forming the edges of the belt, the sides being thinner than the edge portions.

The grinding of the bearing surfaces of the belt down to the thickness indicated, not only increases flexibility and reduces torsional stress, but also secures the lightest section possible commensurate with maximum strength required under the imposed loads. Grinding of the surface should be done with the belt in the permanently "set" or curved condition to secure smooth and silent running. As an alternative, the sides can be ground with the belt stretched out flat and the pulleys crowned slightly to approximately fit the normally arcuate belt. This alternate will not, however, be quite as satisfactory from the standpoint of smooth running.

In mounting the belt on the pulleys, sufficient initial tension should be provided to prevent the centrifugal force developed at high speed from causing the belt to leave the pulley surfaces. The helix of which the belt is formed should be close wound before mounting, so that only a small fraction of an inch clearance will exist between the edges of adjacent convolutions on the inner surface when the belt is mounted under tension on the pulleys. This clearance should not exceed 1/32", and preferably 1/64" under both stationary and full-speed running conditions.

The construction shown offers the greatest flexibility in the operating plane of the belt with sufficient lateral flexibility to permit tracking over flanged pulleys regardless of distortion of chutes and coilers by heating and cooling and, at the same time, limits the tendency to stretch abnormally when passing from standstill to full speed. The belt as described, furthermore, affords a very strong yet highly flexible series of integrally connected spring-like convolutions with resilience or stretch limited to the amount required to make it hug the pulleys under sufficient tension to maintain traction despite the centrifugal force resulting from high speed of travel around pulleys of convenient size. The flattened shape of the belt in cross-section minimizes the centrifugal force as compared with a belt of circular section and also provides increased contact area with the pulleys and with the hot strip being guided and conveyed. This avoids concentration of impact stress and reduces wear on the belt as well as the danger of creasing the strip or cobbling the head or tail end thereof.

The belt is free from a multiplicity of joints or strands subject to rapid internal wear unless constantly lubricated which is practically impossible under the conditions attendant on the application contemplated. A long belt life may thus be expected if the fiber stress in the belt metal is kept well below the elastic limit. The belt will not be seriously affected by temperature variations to which it is subject since it may be kept below 400° F. by suitable cooling sprays. Likewise, the effects of cooling water and finely divided scale will be negligible. The construction shown permits of sufficient resilience in the belt in all directions to operate properly under all conditions without the necessity for take-ups, side guides (except for flanges on the pulleys) etc., which are impractical for the application and speeds contemplated.

Although I have disclosed herein the preferred embodiment of my invention, I intend to cover as well any change or modification therein which may be made without departing from the spirit and scope of the invention.

I claim:

1. A conveyor belt comprising an endless loop of flat metal strip wound into a continuous series of convolutions each of said convolutions having two opposite sides parallel and of substantially the same length, connected by arcuate portions forming the edges of the belt, said loop being adapted to be trained around spaced pulleys under tension with one of said parallel sides in contact therewith, said sides being relatively thin and of substantially less thickness than the edge portions whereby the thicker edge portions can move with respect to one another to relieve the strain on said edge portions.

2. The belt defined by claim 1 characterized by the width of the belt being several times its thickness.

3. The belt defined by claim 1 characterized by said loop being shaped to a curve of the order of that of the pulleys on which it is to be used.

References Cited in the file of this patent
UNITED STATES PATENTS

| Number | Name | Date |
|---|---|---|
| 397,861 | Kelly | Feb. 12, 1889 |
| 994,693 | Shirley | June 6, 1911 |
| 1,263,564 | Kida | Apr. 23, 1918 |
| 1,508,481 | Sonesson | Sept. 16, 1924 |
| 1,683,697 | Rankin | Sept. 11, 1928 |
| 1,868,514 | Anstiss | July 26, 1932 |
| 2,086,857 | Derby | July 13, 1937 |
| 2,148,457 | Grossarth | Feb. 28, 1939 |
| 2,260,587 | Shields | Oct. 28, 1941 |
| 2,307,192 | Boeye | Jan. 5, 1943 |
| 2,363,113 | Bennett | Nov. 21, 1944 |
| 2,371,469 | Rogoff | Mar. 13, 1945 |
| 2,511,700 | Duester | June 13, 1950 |